(12) United States Patent
Tsuda

(10) Patent No.: US 12,427,924 B2
(45) Date of Patent: Sep. 30, 2025

(54) DISPLAY CONTROL DEVICE, DISPLAY PROGRAM STORAGE MEDIUM, AND DISPLAY METHOD

(71) Applicant: TOYOTA JIDOSHA KABUSHIKI KAISHA, Toyota (JP)

(72) Inventor: Hideki Tsuda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/378,902

(22) Filed: Oct. 11, 2023

(65) Prior Publication Data

US 2024/0131989 A1 Apr. 25, 2024
US 2024/0227678 A9 Jul. 11, 2024

(30) Foreign Application Priority Data

Oct. 25, 2022 (JP) ................... 2022-170696

(51) Int. Cl.
*B60R 1/24* (2022.01)

(52) U.S. Cl.
CPC .......... *B60R 1/24* (2022.01); *B60R 2300/202* (2013.01); *B60R 2300/205* (2013.01);
(Continued)

(58) Field of Classification Search
CPC ........................ B60K 2360/1876; B60K 35/23; B60K 35/29; B60R 1/24; B60R 1/23; B60R 1/22; B60R 2300/202; B60R 2300/205; B60R 2300/207; B60R 2300/8093; B60R 2300/308; B60R 2300/307; B60R 2300/305; B60R 2001/1215; B60R 2025/1013; B60R 2025/1016; G06V 20/53; G06V 20/54; G06V 20/56; G06V 20/58; B60W 2050/146; B60W 30/18163; B60W 50/14; B60W 2050/143; B60W 2550/10; B60W 2550/14; G06K 9/00201; G06K 9/00778; G06K 9/00785; G06K 9/00791; G06K 9/00798; G06K 9/00805;
(Continued)

(56) References Cited

U.S. PATENT DOCUMENTS

| | | | |
|---|---|---|---|
| 2012/0046855 A1* | 2/2012 | Wey ................... | G08G 1/09623 701/117 |
| 2016/0152184 A1* | 6/2016 | Ogawa ................... | G09G 5/373 345/589 |

(Continued)

FOREIGN PATENT DOCUMENTS

| JP | 6536855 B2 | 7/2019 |
|---|---|---|
| WO | 2017/056157 A1 | 4/2017 |

*Primary Examiner* — Nathnael Aynalem
(74) *Attorney, Agent, or Firm* — Oliff PLC

(57) ABSTRACT

A display control device includes: a memory; and a processor coupled to the memory and configured to: acquire information of a moving body in surroundings of a vehicle; and display a specific image on a display area provided to the vehicle according to a position of the moving body based on the acquired information of the moving body, the specific image being displayed either overlaid on or adjacent to the moving body; and in a case in which the moving body inside the display area has exited from the display area, continue to display the specific image until a specific period of time has elapsed.

9 Claims, 14 Drawing Sheets

(52) U.S. Cl.
CPC ... *B60R 2300/207* (2013.01); *B60R 2300/308* (2013.01); *B60R 2300/8093* (2013.01)

(58) Field of Classification Search
CPC ........... G06K 9/00812; G06K 9/00818; G06K 9/00825; G06K 9/00845; G06K 9/325; G06K 2209/15; G06K 2209/23; G06T 2207/30236; G06T 2207/30248; G06T 2207/30252; G06T 2207/30256; G06T 2207/30261; G06T 2207/30264; G06T 2207/30268; G08G 1/16; G08G 1/116; G08G 1/167; G08G 1/166; G08G 1/168; G08G 1/20; G01S 17/93; G01S 17/931; H04W 4/40
USPC .......................................................... 348/148
See application file for complete search history.

(56) References Cited

U.S. PATENT DOCUMENTS

2016/0379497 A1* 12/2016 Hatakeyama ............. B60R 1/24
                                                                                340/435
2018/0198955 A1* 7/2018 Watanabe ............... B60K 35/00
2018/0240258 A1* 8/2018 Kosaka ................ B60W 50/14

* cited by examiner

DISPLAY CONTROL DEVICE, DISPLAY PROGRAM STORAGE MEDIUM, AND DISPLAY METHOD

CROSS-REFERENCE TO RELATED APPLICATION

This application is based on and claims priority under 35 USC 119 from Japanese Patent Application No. 2022-170696 filed on Oct. 25, 2022, the disclosure of which is incorporated by reference herein.

BACKGROUND

Technical Field

The present disclosure relates to a display control device, a display program storage medium, and a display method.

Related Art

Japanese Patent No. 6536855 discloses technology to display a mark image or the like overlaid on a scene ahead viewed by an occupant of a vehicle through a windshield glass using a head-up display device. In Japanese Patent No. 6536855, a mark image indicating that a lead vehicle is captured is displayed together with the lead vehicle, with the mark image being displayed at a time frequency that changes as the lead vehicle exits outside from vehicle width direction ends of a display area of the head-up display device.

In the head-up display device of Japanese Patent No. 6536855, although the mark image is displayed at a changed time frequency, there is still a concern that an occupant (driver) might feel uneasy if the overlay display suddenly vanishes when the lead vehicle has exited from the display area. There would also be a concern that the occupant (driver) would feel unsettled were the mark image to continue to be displayed when the lead vehicle has exited from the display area.

SUMMARY

The present disclosure provides a display control device, a display program storage medium, and a display method that, in cases in which a specific image is displayed on a display area provided to a vehicle together with a moving body in surroundings of the vehicle, may assist an occupant (e.g., a driver) of the vehicle by alleviating an unsettled feeling of the occupant caused by the moving body being moved from inside to outside the display area.

A display control device of a first aspect includes an acquisition section and a control section. The acquisition section acquires information of a moving body in surroundings of a vehicle. The control section displays a specific image on a display area provided to the vehicle according to a position of the moving body based on the acquired information of the moving body so as to be displayed either overlaid on or adjacent to the moving body, and in a case in which the moving body inside the display area has exited from the display area, continues to display the specific image being displayed until a specific period of time has elapsed.

In the display control device of the first aspect, the control section displays the specific image together with the moving body in a case in which the moving body in the vehicle surroundings is present in the display area provided to the vehicle. In this display control device, after the moving body has exited from inside to outside the display area, the control section continues to display the specific image in the display area until the specific period of time has elapsed. This display control device enables, in cases in which the specific image is being displayed on the display area provided to the vehicle together with the moving body in the vehicle surroundings, alleviating an unsettled feeling of an occupant (driver) caused by the moving body being moved from inside to outside the display area, thereby assisting the occupant's operation of the vehicle. Note that reference here to "overlaid (displaying overlaid)" means, for example, displaying a specific image superimposed on an object or figure previously visible in the display area. Moreover, reference here to "adjacent (displaying adjacent)" means, for example, displaying a specific image to be displayed at a periphery of an object or figure previously visible in the display area.

A display control device of a second aspect is the configuration of the first aspect, including the control section that changes a mode of the specific image according to a position of the moving body when the moving body has exited from the display area.

The display control device of the second aspect may alleviate the driver's unsettled feeling since the mode of the specific image being changed according to the position of the moving body from the vehicle.

A display control device of third aspect is the configuration of the second aspect, including the control section that displays the specific image smaller the longer a distance is between the moving body and the vehicle.

The display control device according to the third aspect facilitates ascertaining a feeling of distance to the moving body due to the specific image being displayed smaller the longer the distance is between the moving body and the vehicle, enabling the driver to feel less unsettled.

A display control device according to a fourth aspect is the configuration of the second aspect, including the control section that reduces a brightness of the specific image the longer a distance is between the moving body and the vehicle.

The display control device of the fourth aspect facilitates ascertaining a feeling of distance to the moving body due to the brightness of the specific image being reduced the longer the distance is between the moving body and the vehicle, enabling the driver to feel less unsettled.

The display control device of a fifth aspect is the configuration of the second aspect, including the control section that displays the specific image with a color that is fainter the longer a distance is between the moving body and the vehicle.

The display control device of the fifth aspect facilitates ascertaining a feeling of distance to the moving body due to the specific image being displayed with a fainter color the longer the distance is between the moving body and the vehicle, enabling the driver to feel less unsettled.

The display control device of a sixth aspect, is the configuration of the first aspect, including the control section that gradually eliminates the specific image from the display area after the specific period of time has elapsed.

The display control device of the sixth aspect gradually eliminates the specific image from the display area when the specific period of time has elapsed. Therefore, for example, in cases in which the display area is one in which the specific image is being displayed overlaid on a real image of the moving body, as in a head-up display, a boundary of the display area becomes less discernable, enabling a driver to feel less unsettled.

A display control device of a seventh aspect is the configuration of the first aspect, wherein the specific image is a bent line including a bent portion projecting upward in the display area, and the control section makes a minor angle of the bent portion smaller the longer a distance is between the vehicle and the moving body.

In the display control device of the seventh aspect, ascertaining a feeling of distance to the moving body is facilitated due to making the minor angle of the bent portion of the bent line, which is the specific image, smaller the longer the distance is between the vehicle and the moving body, enabling the driver to feel less unsettled.

An eighth aspect is a non-transitory storage medium stored with a program that causes a computer to execute display control processing. The display control processing includes acquiring information of a moving body in surroundings of a vehicle, displaying a specific image on a display area provided to the vehicle according to a position of the moving body based on the acquired information of the moving body so as to be displayed either overlaid on or adjacent to the moving body, and in a case in which the moving body inside the display area has exited from the display area, continuing to display the specific image being displayed until a specific period of time has elapsed.

In the display control processing of the eight aspect, the specific image is eliminated when the specific period of time has elapsed from when the moving body exited from the display area, thereby the driver's unsettled feeling caused by the display may be alleviated.

A display method of a ninth aspect is processing executed by a computer. This processing includes acquiring information of a moving body in surroundings of a vehicle, displaying a specific image on a display area provided to the vehicle according to a position of the moving body based on the acquired information of the moving body so as to be displayed either overlaid on or adjacent to the moving body, and in a case in which the moving body inside the display area has exited from the display area, continuing to display the specific image being displayed until a specific period of time has elapsed.

In the display method of the ninth aspect, the specific image is eliminated when the specific period of time has elapsed from when the moving body exited from the display area, thereby the driver's unsettled feeling caused by the display may be alleviated.

A display control device of a tenth aspect includes an acquisition section that acquires information of a moving body in surroundings of a vehicle, and a control section that displays a specific image on a display area provided to the vehicle according to a position of the moving body based on the acquired information of the moving body so as to be displayed either overlaid on or adjacent to the moving body, and that, in a case in which the moving body inside the display area has exited from the display area, suppresses display of the specific image when a distance between the moving body and the vehicle has reached a specific distance.

In the display control device of the tenth aspect, the control section displays the specific image together with the moving body when the moving body in the vehicle surroundings is present in the display area provided to the vehicle. In this display control device, when the moving body has exited from inside to outside the display area and moreover the distance between the moving body and the vehicle has reached the specific distance, the control section suppresses display of the specific image. This display control device enables, in cases in which the specific image is being displayed on the display area provided to the vehicle together with the moving body in the vehicle surroundings, an occupant to feel less unsettled, since the specific image not vanishing suddenly even though the moving body has moved from inside to outside the display area.

The present disclosure enables, in cases in which a specific image is being displayed on a display area provided to a vehicle together with a moving body in surroundings of a vehicle, an occupant to be suppressed from being imparted with an unsettled feeling even though the moving body has moved from inside to outside the display area.

BRIEF DESCRIPTION OF THE DRAWINGS

Exemplary embodiments of the present disclosure will be described in detail based on the following figures, wherein.

DETAILED DESCRIPTION

Description follows regarding a display control device according to the present disclosure. The display control device displays a specific image in a display area provided to a vehicle either by display overlaid on or adjacent to a moving body in surroundings of a vehicle. Then, when the moving body exited from the display area, changes a mode of the specific image according to a distance between the vehicle and the moving body, and ends display after a specific period of time has elapsed from when the moving body exited from the display area.

First Exemplary Embodiment

Overall Configuration

An overall configuration of a vehicle 12 applied with a display control device 10 according to a first exemplary embodiment will now be described, with reference to FIG. 1.

Figure 1:
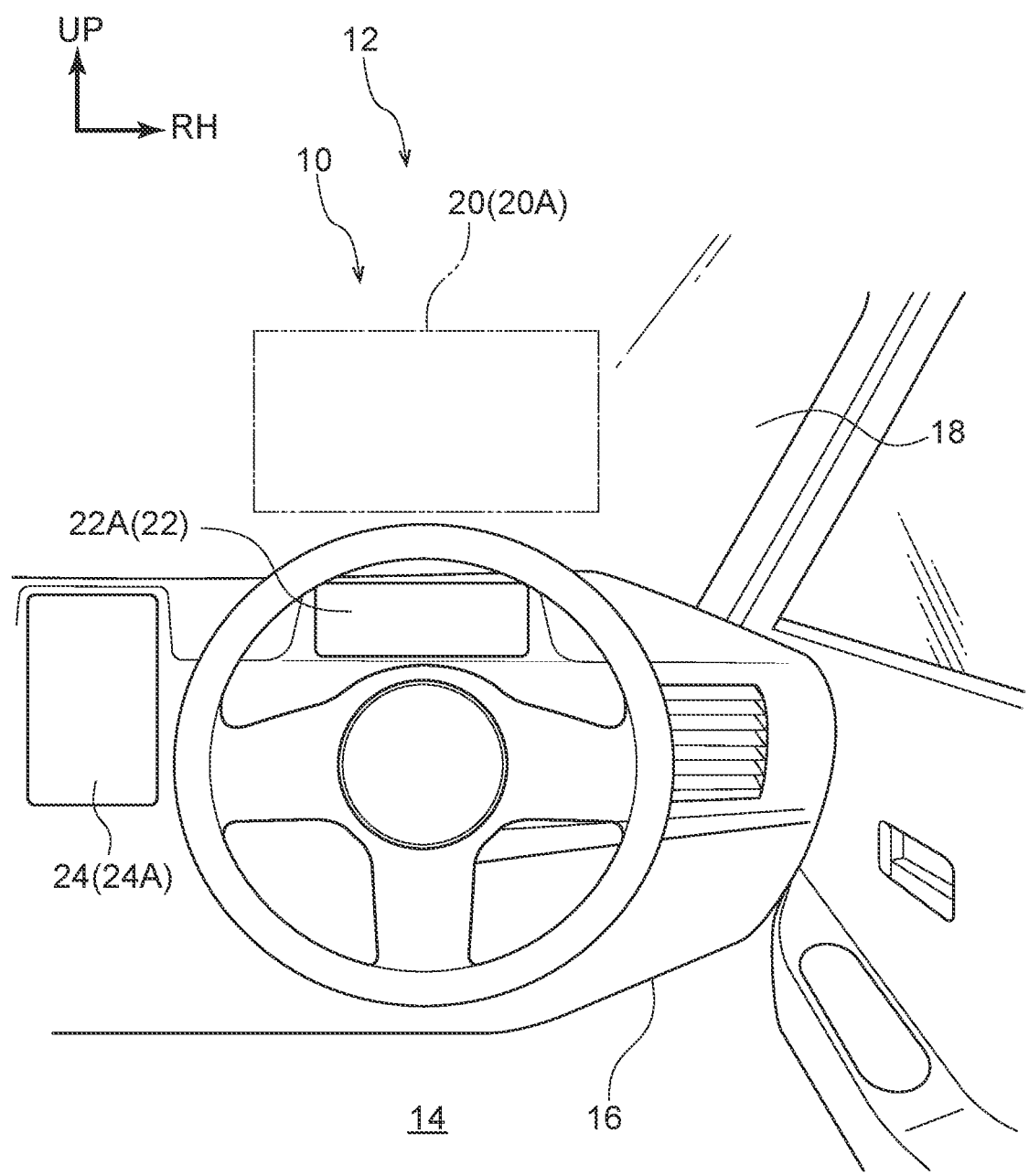
FIG. 1 is a schematic diagram of a front section inside a vehicle cabin of a vehicle applied with a display control device in a first exemplary embodiment, as viewed from a vehicle rear side.

As illustrated in FIG. 1, an instrument panel 16 is provided to a front section of the inside a vehicle cabin 14 of the vehicle 12. The instrument panel 16 extends along the vehicle width direction, and a windshield glass 18 is provided at a front edge of the instrument panel 16. The windshield glass 18 extends toward a vehicle upper side from the front edge of the instrument panel 16, and partitions between the outside and the inside of the vehicle cabin 14 of the vehicle 12.

A head-up display (hereafter referred to as "HUD") projection surface 20 including a display area 20A is provided on the windshield glass 18 at a vehicle upper side of a meter display 22. The HUD projection surface 20 is a projection surface projected onto by a HUD device 21. More specifically, the HUD device 21 is provided at a vehicle front side of the instrument panel 16, and is configured such that an image from the HUD device 21 is projected onto the HUD projection surface 20 of the windshield glass 18. Namely, the HUD projection surface 20 configures part of the windshield glass 18.

The meter display 22 including a display area 22A is provided on the instrument panel 16. The meter display 22 is provided at a vehicle front side of a driver's seat at a vehicle width direction right side of the instrument panel 16. The meter display 22 is connected to various meter instruments installed to the vehicle 12, and is provided at a position entering a field of view in a state in which a driver is gazing in front of the vehicle.

A center display 24 including a display area 24A is provided to the instrument panel 16. The center display 24 is arranged at a vehicle width direction center portion of the instrument panel 16.

Hardware Configuration of Display Control Device 10

Figure 2:
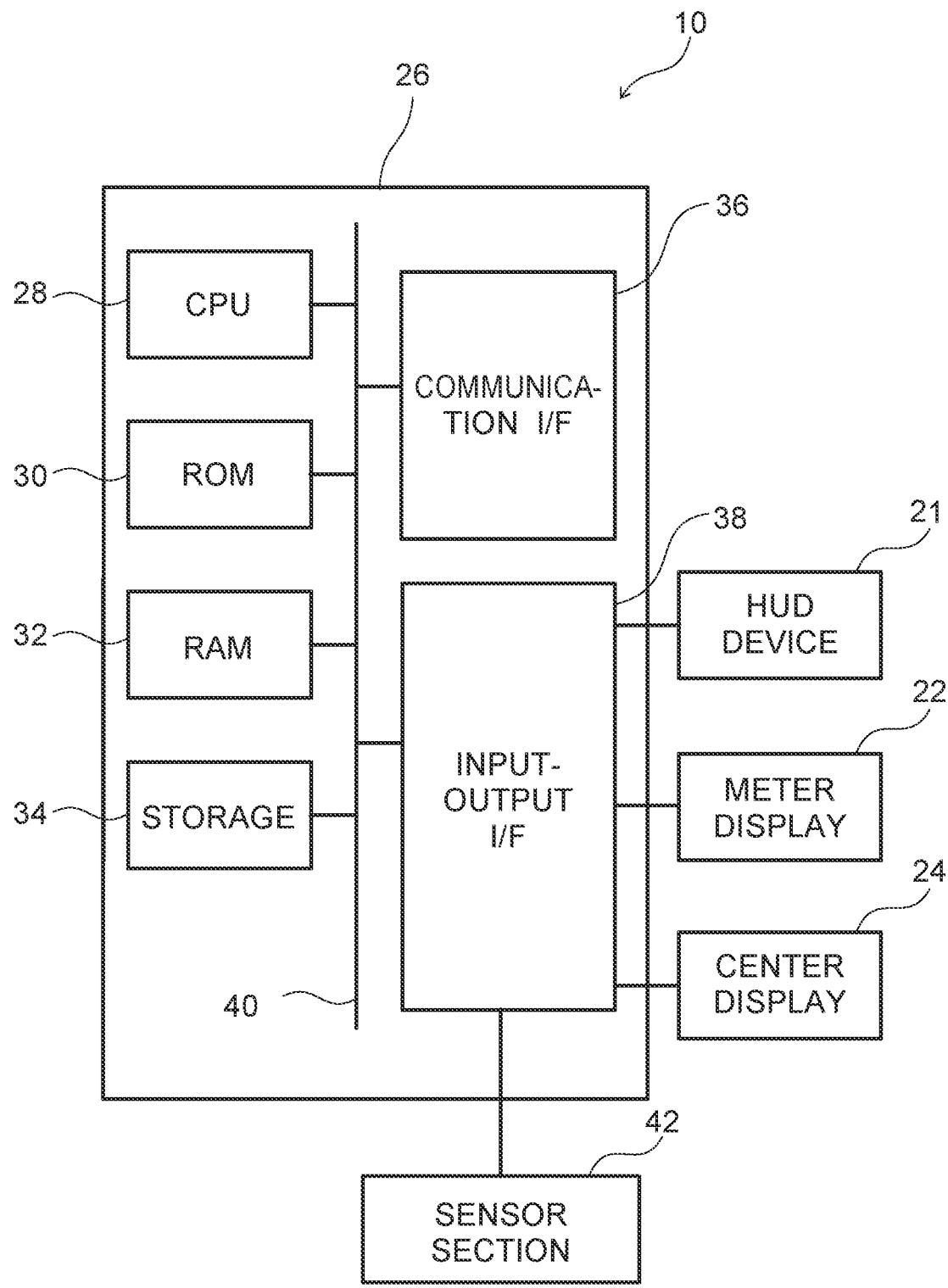
FIG. 2 is a block diagram illustrating a hardware configuration of a display control device according to the first exemplary embodiment.

Description follows regarding a hardware configuration of the display control device 10 provided to the vehicle 12, with reference to FIG. 2. The display control device 10 of the present exemplary embodiment includes an electronic control unit (ECU) 26. Note that although an example will be given in the present exemplary embodiment of an embodiment in which processing is performed by a single ECU, an embodiment may be adopted in which plural ECUs are provided, and processing is performed across the plural ECUs.

As illustrated in FIG. 2, the ECU 26 of the display control device 10 includes a central processing unit (CPU: processor) 28, read only memory (ROM) 30, random access memory (RAM) 32, storage 34, a communication interface (communication I/F) 36, and an input-output interface (input-output I/F) 38. Each configuration is connected through a bus 40 so as to be capable of communicating with each other.

The CPU 28 is a central processing unit and executes various programs and controls each section. Namely, the CPU 28 reads a program from the ROM 30 or the storage 34, and executes the program using the RAM 32 as workspace.

The ROM 30 stores various programs and various data. The RAM 32 serves as workspace to temporarily store programs and/or data. The storage 34 is configured by a hard disk drive (HDD) or a solid state drive (SSD), and is stored with various programs including an operating system and various data. In the present exemplary embodiment, a program and various data and the like for performing display processing are stored in the ROM 30 or the storage 34.

Note that each program may be provided in a format stored on a non-transitory storage medium such as a compact disc read only memory (CD-ROM), a digital versatile disc read only memory (DVD-ROM), a universal serial bus (USB) memory, or the like. Programs may also be provided in a format downloadable from an external device over a network.

The HUD device 21, the meter display 22, the center display 24, and a sensor section 42 are connected to the input-output I/F 38. An image is projected onto the HUD projection surface 20 by the HUD device 21.

The communication I/F 36 is an interface for the display control device 10 to communicate with a non-illustrated server or other devices, and employs a standard such as, for example, Ethernet (registered trademark), LTE, FDDI, or Wi-Fi (registered trademark).

Plural sensors from out of various sensors such as a camera, radar, LIDAR, a GPS sensor, or the like are included in the sensor section 42. In particular a camera of the present exemplary embodiment captures images of the surroundings of the vehicle 12 and is configured including at least a front camera that captures images in front of the vehicle.

In the vehicle 12, the sensor section 42, or a driver assistance section that executes plural driver assistance applications and is provided so as to be able to communicate with the sensor section 42, performs computational processing based on plural sensor information. The driver assistance applications include, for example, collision avoidance control, adaptive cruise control (ACC), and the like. The ECU 26 is able to acquire such driver assistance applications and sensor information through the input-output I/F 38.

Functional Configuration of Display Control Device 10

Description follows regarding a functional configuration implemented by the display control device 10 using the hardware resources described above, with reference to FIG. 3, and FIG. 4A to FIG. 4C.

Figure 3:
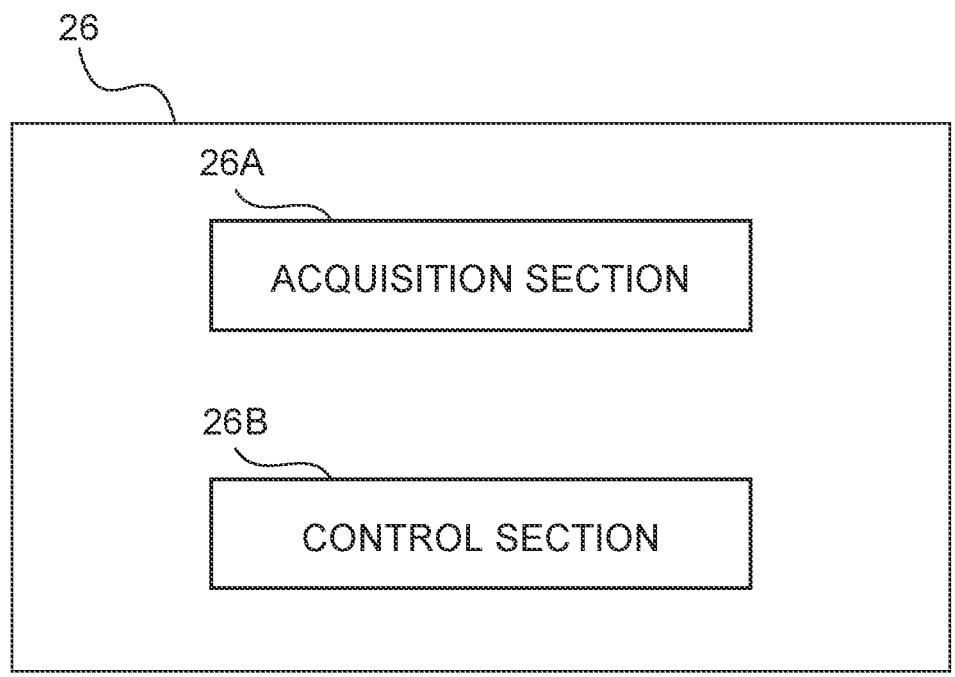
FIG. 3 is a block diagram illustrating a functional configuration of a display control device according to the first exemplary embodiment.

As illustrated in FIG. 3, the ECU 26 of the display control device 10, from a functional configuration perspective, includes an acquisition section 26A and a control section 26B. Each of the functional configuration is implemented by the CPU 28 reading and executing a program stored on the ROM 30 of the storage 34.

The acquisition section 26A acquires information about a moving body in the vehicle surroundings. More specifically, the information related to a position of a lead vehicle 44 traveling in front of the vehicle 12 is acquired. For example, the acquisition section 26A acquires captured image data captured in front of the vehicle by the front camera, and detects coordinate data of the lead vehicle 44 based on the acquired captured image data of the lead vehicle 44. Note that although in the present exemplary embodiment an example will be described of the lead vehicle 44 serving as a moving body, the moving body may be another traffic participant, such as a motorcycle, moped, bicycle, or the like, and in such cases information according to moving body category may be acquired from the driver assistance section executing plural driver assistance applications.

Based on the information related to the position of the lead vehicle 44 as acquired by the acquisition section 26A, the control section 26B detects whether or not the lead vehicle 44 has exited from the display area 20A of the HUD projection surface 20. More specifically, for example, position coordinates corresponding to the display area 20A are set in advance, and determination is made as to whether the coordinate data of the lead vehicle 44 as acquired by the acquisition section 26A is inside or outside the display area 20A. In a case in which the lead vehicle 44 is outside the display area 20A, the control section 26B detects that the lead vehicle 44 has exited from the display area 20A of the HUD projection surface 20.

Moreover, the control section 26B generates an image to display on the HUD projection surface 20. Images generated by the control section 26B include for example, in addition to a mark 46 serving as a specific image, a meter image representing a meter display to indicate a traveling speed of the vehicle 12, and various images for assisting manual driving and automated driving.

Figure 4A:
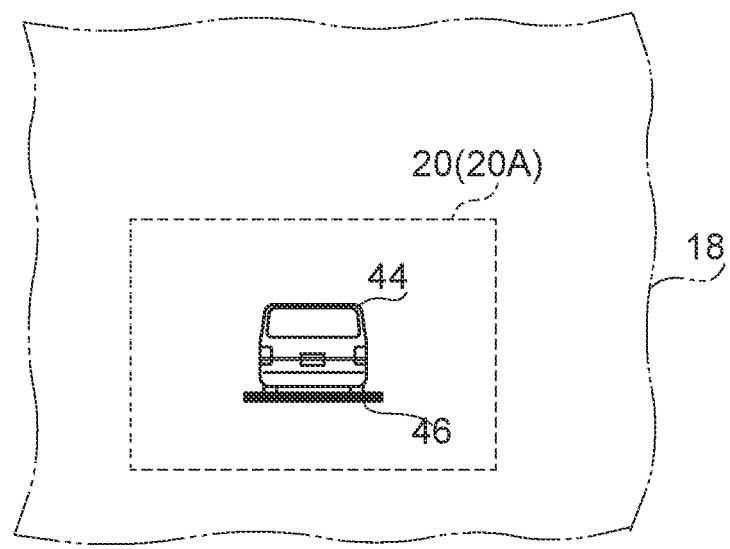
FIG. 4A is a diagram illustrating an example of a display of a specific image according to the first exemplary embodiment, and is a diagram illustrating a state in which a lead vehicle is present inside a display area.
Figure 4B:
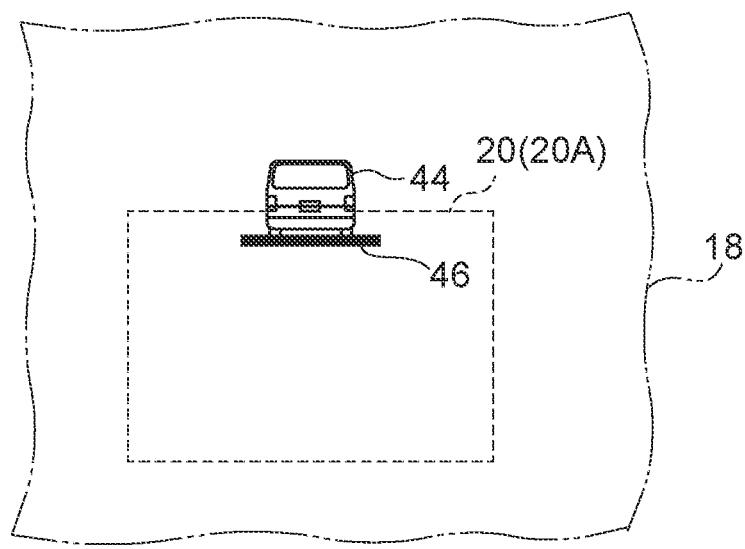
FIG. 4B is a diagram illustrating an example of a display of a specific image according to the first exemplary embodiment, and is a diagram illustrating a state in which a lead vehicle is present in a vicinity of a boundary to a display area.
Figure 4C:
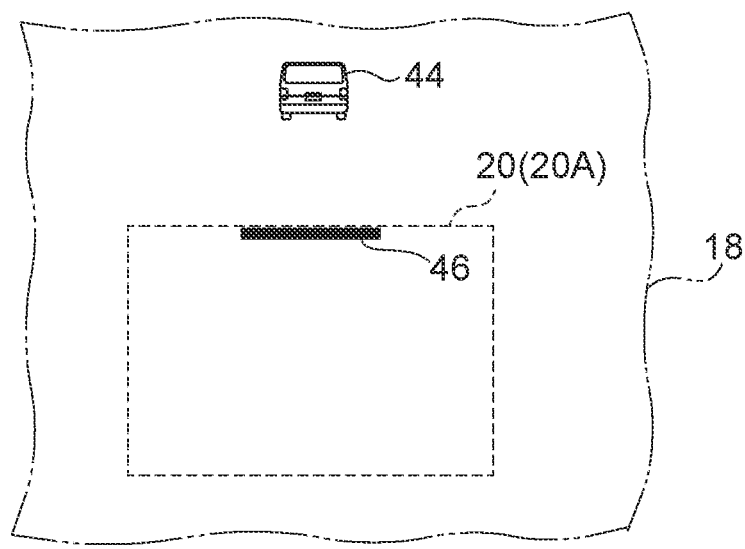
FIG. 4C is a diagram illustrating an example of a display of a specific image according to the first exemplary embodiment, and is a diagram illustrating a state in which a lead vehicle has exited from a display area.

In a case in which the lead vehicle 44 is positioned inside the display area 20A, based on the acquired information of the lead vehicle 44 the control section 26B displays the mark 46 according to the position of the lead vehicle 44 on the display area 20A provided to the vehicle 12 so as to be displayed adjacent to the lead vehicle 44. In particular in the present exemplary embodiment, in cases in which ACC has been actuated, a straight line shaped mark 46 is displayed so as to be adjacent to a rear end of the lead vehicle 44 being followed. FIG. 4A is a diagram illustrating a state in which ACC is actuated and the mark 46 has been displayed. FIG. 4B is a diagram illustrating a state in which the lead vehicle 44 is traveling faster than the vehicle 12, and so the lead vehicle 44 is further away from the vehicle 12 than in the state illustrated in FIG. 4A. FIG. 4C is a diagram illustrating a state in which the lead vehicle 44 is further away from the vehicle 12 than in the state illustrated in FIG. 4B because the lead vehicle 44 has continued traveling faster than the vehicle 12.

In a case in which the lead vehicle 44 has exited from the display area 20A as a result of being far away from the vehicle 12, the control section 26B continues to display the mark 46 until a specific period of time has elapsed from when the lead vehicle 44 exited from the display area 20A. In particular in the present exemplary embodiment, as illustrated in FIG. 4C, in a case in which the lead vehicle 44 has exited from the display area 20A, the mark 46 is displayed for the specific period of time at the position it was present at when it exited from the display area 20A, and then display of the mark 46 is ended after the specific period of time has elapsed.

The control section 26B displaying the mark 46 for the specific period of time enables a concern to be suppressed that a driver might feel uneasy due to sudden vanishing of overlaid display when a lead vehicle has exited from the display area. Moreover, a concern can be suppressed that display becomes complicated by repeated display/non-display of overlaid display when a lead vehicle (namely the lead vehicle 44) repeatedly enters inside and exits from the display area. Moreover, due to ending display of the mark 46 after the specific period of time has elapsed, a concern can be suppressed that a driver might feel unsettled as a result of overlaid display continuing in a situation in which overlaid display to match the lead vehicle is unable to be displayed.

Note that the present exemplary embodiment is an embodiment in which the mark 46 continues to be displayed while ACC is actuated, however an embodiment may be adopted in which the mark 46 is displayed only for a predetermined period of time from when the ACC was actuated even though the lead vehicle 44 is still present in the display area 20A. For an embodiment in which the mark 46 is displayed only for the predetermined period of time from when the ACC was actuated, the control described above is performed when the lead vehicle 44 has exited from the display area 20A during this predetermined period of time. Moreover, an embodiment may be adopted in which, for example, the mark 46 is an image of a freely selected shape, and may be overlaid on the entire lead vehicle 44. Moreover, an embodiment may be adopted in which a shape of the mark 46 is selected based on a moving body category.

Note that embodiment may be adopted in which the control section 26B suppresses display of the mark 46 in a case in which the lead vehicle 44 has exited from the display area 20A as a result of becoming far away from the vehicle 12 and the distance between the vehicle 12 and the lead vehicle 44 has reached a specific distance. Due to the mark 46 not vanishing suddenly even though the lead vehicle 44 has moved outside from the display area 20A, in such cases too, the occupant may feel less unsettled.

Control Flow

Figure 5:
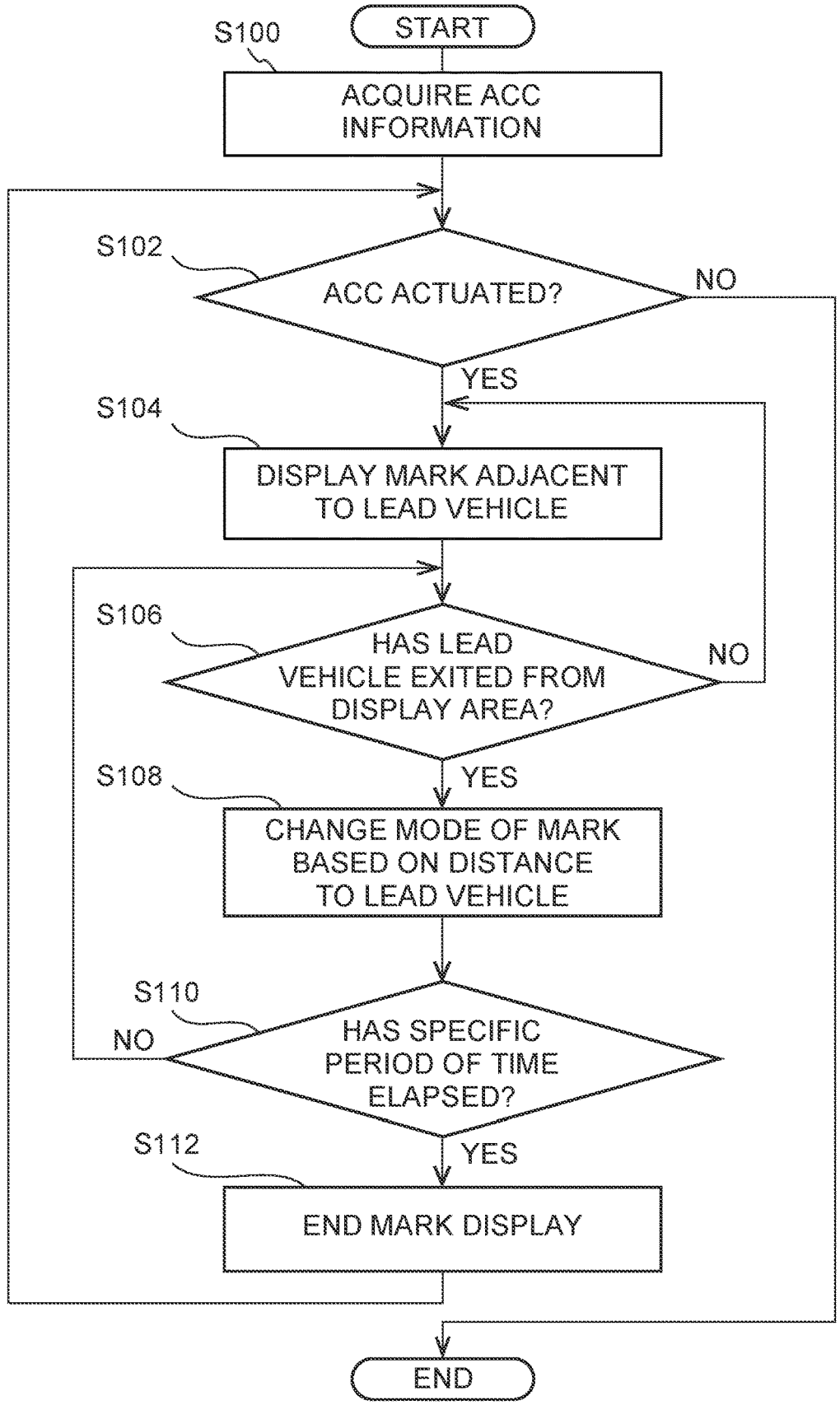
FIG. 5 is a flowchart illustrating an example of a flow of display processing according to the first exemplary embodiment.

Description follows regarding a flow of processing executed in the display control device 10 of the present exemplary embodiment, with reference to a flowchart of FIG. 5, and examples in FIG. 4A to FIG. 4C of display related to the mark 46. The processing of the display control device 10 is executed by the ECU 26 functioning as the acquisition section 26A and the control section 26B.

At step S100, the ECU 26 acquires driver assistance application information through the input-output OF 38. In particular in the present exemplary embodiment, information related to ACC and information related to the lead vehicle 44 being followed is acquired. This information is, for example, a signal indicating whether or not ACC is actuated, information related to a distance to the lead vehicle 44, information related to coordinates of the lead vehicle 44, and the like.

At step S102, the ECU 26 determines whether or not ACC is actuated. The ECU 26 ends the flow in cases in which negative determination is made (step S102=NO). However, the ECU 26 proceeds to step S104 in cases in which an affirmative determination was made (step S102=YES).

At step S104, based on the acquired information the ECU 26 displays the mark 46 so as to be adjacent to a rear end of the lead vehicle 44. Namely, as illustrated in FIG. 4A, the mark 46 is displayed in the display area 20A so as to be adjacent to a bottom end of the actual lead vehicle 44.

At step S106, the ECU 26 determines whether or not the lead vehicle 44 has exited from the display area 20A. The ECU 26 returns to step S104 in cases in which a negative determination was made (step S106=NO), and the mark 46 continues to be displayed. However, the ECU 26 proceeds to step S108 in cases in which an affirmative determination was made (step S106=YES).

At step S108, the ECU 26 changes a mode of the mark 46 according to a position of the lead vehicle 44. For example, the ECU 26 may display the mark 46 with a brightness that reduces the longer the distance is between the vehicle 12 and the lead vehicle 44, or may display the mark 46 with a color that get fainter the longer the distance is between the vehicle 12 and the lead vehicle 44.

At step S110, the ECU 26 determines whether or not a specific period of time has elapsed from when the lead vehicle 44 exited from the display area 20A. Then the ECU 26 returns to step S106 in cases in which a negative determination has been made (step S110=NO), and proceeds to step S112 when affirmative determination has been made (step S110=YES).

At step S112, the ECU 26 eliminates the mark 46, which has been displayed so as to be adjacent to the rear edge of the lead vehicle 44, from the display area 20A. For example, a mode may be adopted in which the mark 46 is eliminated gradually from the display area 20A, and a mode may be adopted in which the mark 46 is eliminated from the display area 20A after being flashed plural times. For the mode in which the mark 46 is eliminated gradually, the brightness thereof may be decreased gradually, or the transparency thereof may be raised gradually.

Figure 6A:
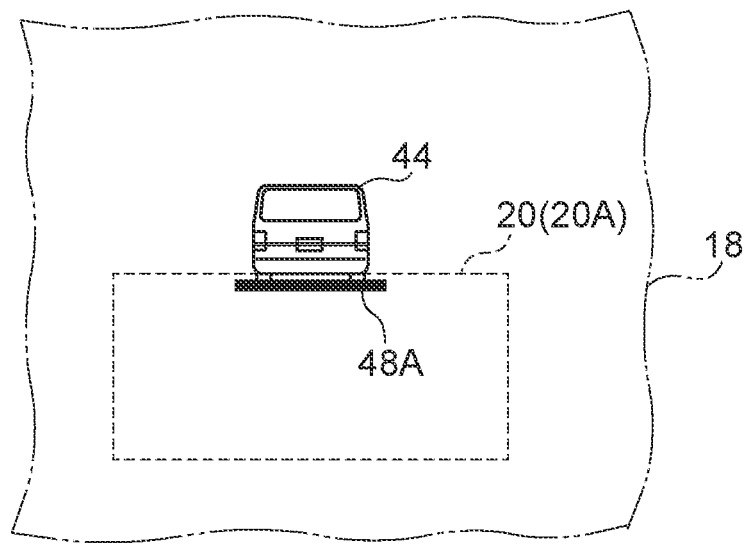
FIG. 6A is a diagram illustrating an example of a display of a specific image according to a different mode of the first exemplary embodiment, and is a diagram illustrating a state in which a lead vehicle is present in a vicinity of a boundary to a display area.
Figure 6B:
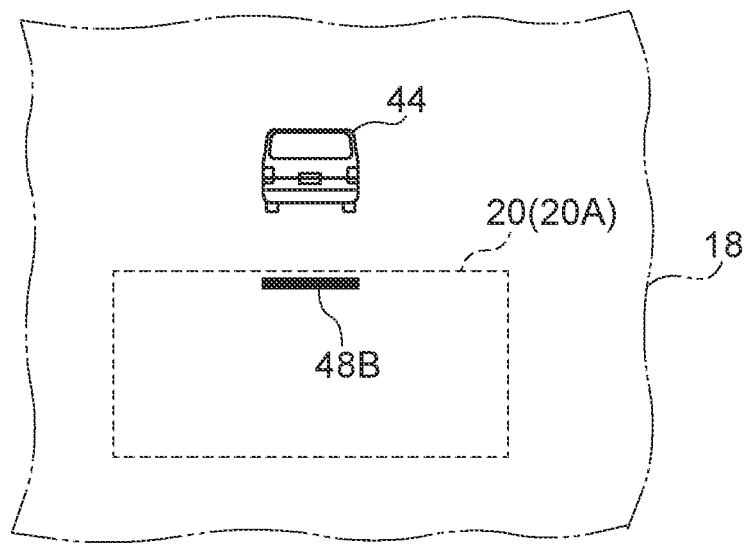
FIG. 6B is a diagram illustrating an example of a display of a specific image according to a different mode of the first exemplary embodiment, and is a diagram illustrating a state in which a lead vehicle has exited from a display area.
Figure 6C:
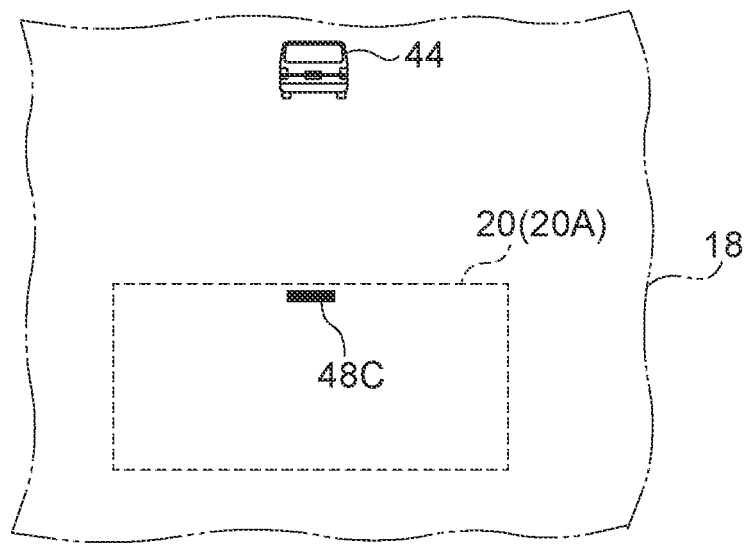
FIG. 6C is a diagram illustrating an example of a display of a specific image according to a different mode of the first exemplary embodiment, and is a diagram illustrating a state in which a lead vehicle has exited a long way from a display area.

As a separate mode, for example, the ECU 26 may display a mark 48A so as to be smaller the longer the distance is between the vehicle 12 and the lead vehicle 44. With reference to FIG. 6A, FIG. 6B, and FIG. 6C, images get smaller in sequence from mark 48A, to mark 48B, to mark 48C the longer the distance is between the lead vehicle 44 and the vehicle 12 in the sequence from FIG. 6A, to FIG. 6B, to FIG. 6C. Displaying the marks 48A, 48B and 48C so as to be smaller the longer the distance is between the lead vehicle 44 and the vehicle 12 facilitates ascertaining a feeling of distance to the lead vehicle 44 serving as the moving body, enabling the driver to be suppressed from feeling unsettled. In the present mode the mark 48A, the mark 48B, and the mark 48C are examples of the specific image.

Figure 7A:
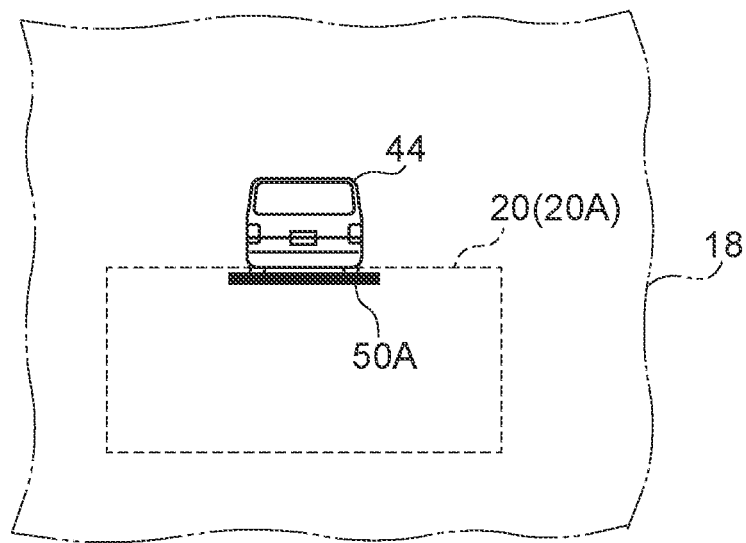
FIG. 7A is a diagram illustrating an example of a display of a specific image according to a different mode of the first exemplary embodiment, and is a diagram illustrating a state in which a lead vehicle is present in a vicinity of a boundary to a display area.
Figure 7B:
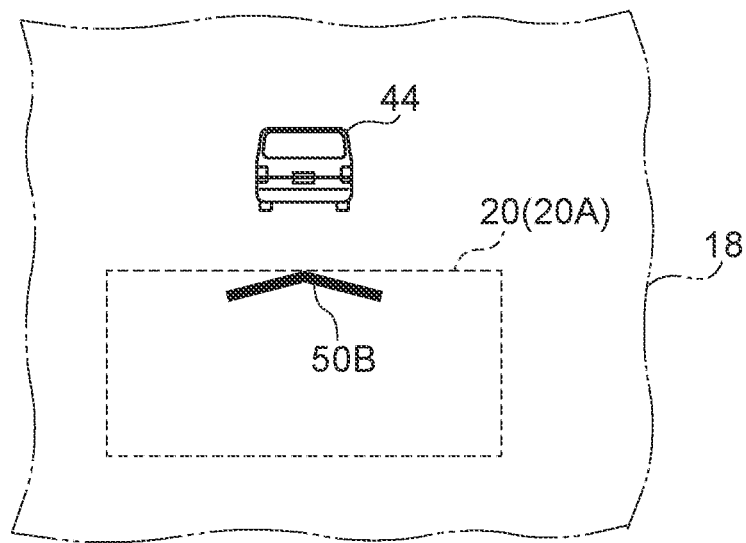
FIG. 7B is a diagram illustrating an example of a display of a specific image according to a different mode of the first exemplary embodiment, and is a diagram illustrating a state in which a lead vehicle has exited from a display area.
Figure 7C:
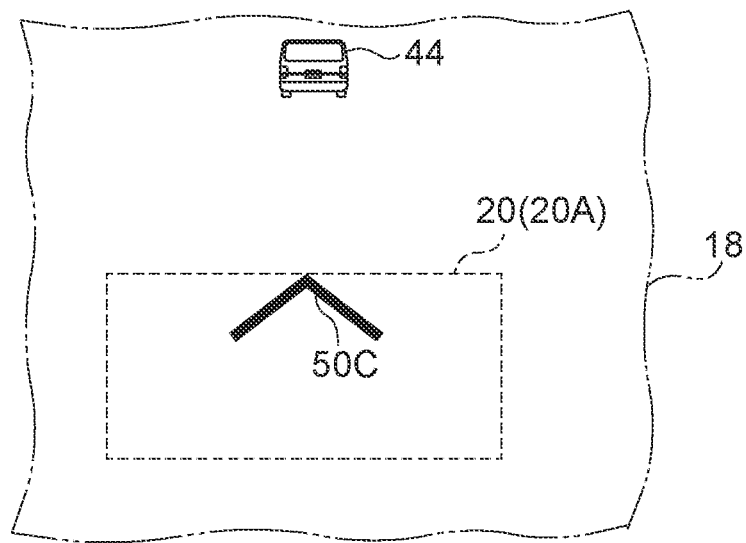
FIG. 7C is a diagram illustrating an example of a display of a specific image according to a different mode of the first exemplary embodiment, and is a diagram illustrating a state in which a lead vehicle exited a long way from a display area.

In a further separate mode, for example, the ECU 26 may display a bent line including a bent portion projecting upward in the display area 20A so as to be adjacent to the rear end of the lead vehicle 44. In such cases, the bent line may be displayed such that a minor angle of the bent portion is smaller the longer the distance is between the lead vehicle 44 and the vehicle 12. With reference to FIG. 7A, FIG. 7B, and FIG. 7C, the minor angle of the bent portion gets smaller in the sequence from the mark 50A, to the mark 50B, to the mark 50C the longer the distance is between the lead vehicle 44 and the vehicle 12 in the sequence from FIG. 7A, to FIG. 7B, to FIG. 7C. Displaying the minor angle of the bent portion getting smaller the longer the distance is between the lead vehicle 44 and the vehicle 12 facilitates ascertaining a feeling of distance to the lead vehicle 44, enabling the driver to be suppressed from feeling unsettled. In the present mode the mark 50A, the mark 50B, and the mark 50C are examples of a specific image.

Second Exemplary Embodiment

In the exemplary embodiment described above, a case was described in which the display area 20A is configured by the HUD projection surface 20, however the present disclosure is not limited thereto. A mark 46 may be displayed on a display area of a center display 24 provided to the instrument panel 16, as in the second exemplary embodiment illustrated in FIG. 8.

Figure 8:
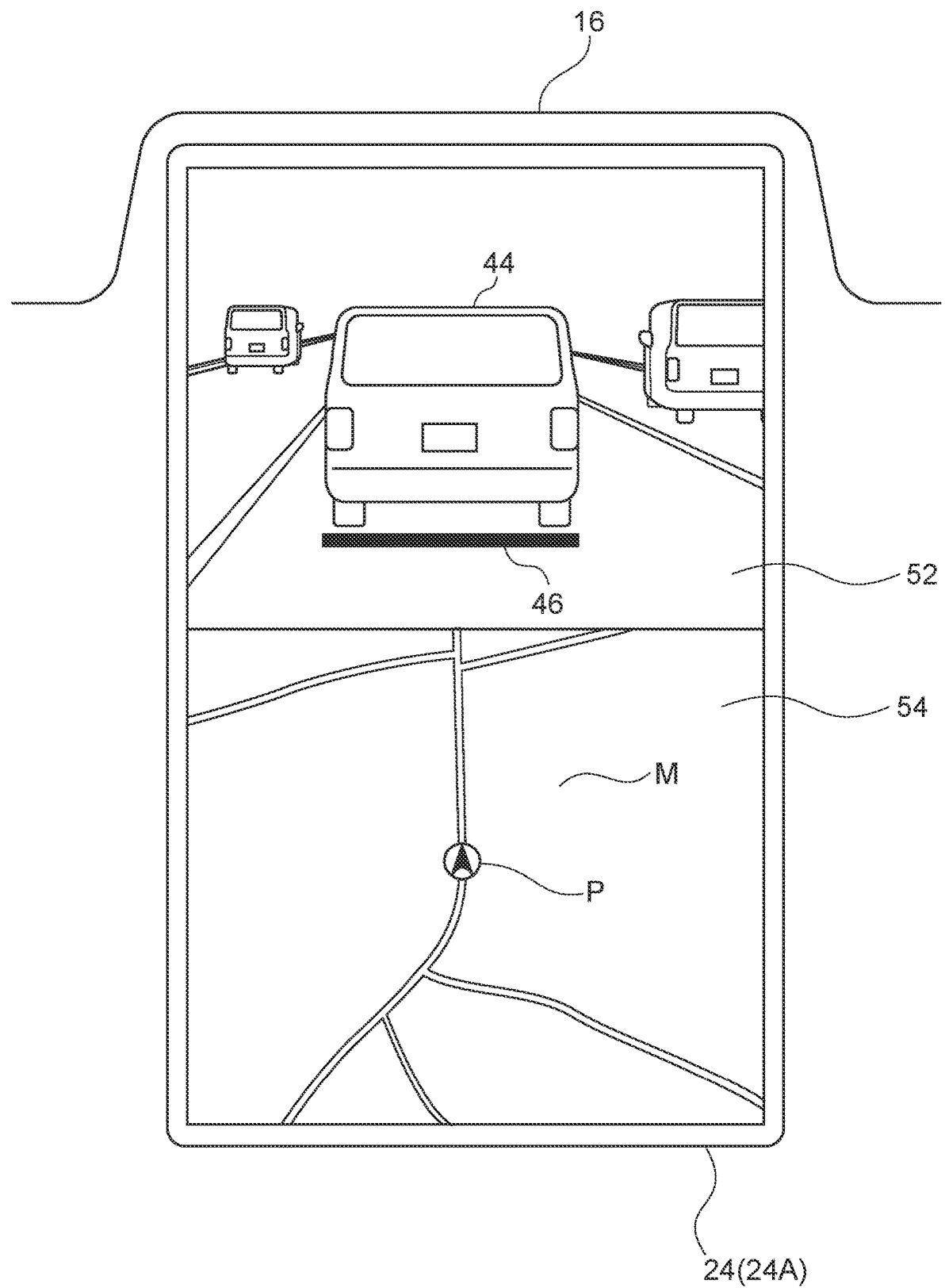
FIG. 8 is a diagram illustrating an example of a display of a specific image according to a second exemplary embodiment.

As illustrated in FIG. 8, in the second exemplary embodiment a display area 24A of the center display 24 is divided into upper and lower sections. A scene ahead image illustrating a scene ahead of the vehicle 12 is displayed in an upper section 52 of the display area 24A, and a map image M illustrating a current position of the vehicle 12 is displayed in a lower section 54 of the display area 24A.

The scene ahead image is, for example, configured by an image captured with the front camera configuring the sensor section 42. In contrast to in the first exemplary embodiment, in a case in which the lead vehicle 44 has exited from the upper section 52 of the display area 24A, namely in a case in which the lead vehicle 44 is no longer present inside an angle of view of the captured image being displayed in the upper section 52 of the display area 24A, the mark 46 is displayed for a specific period of time in the second exemplary embodiment at a position where the lead vehicle 44 exited the upper section 52 of the display area 24A (at an edge of the display area 24A).

In the second exemplary embodiment, the mark 46 is displayed on the center display 24 provided to the instrument panel 16, and the mark 46 is displayed for a specific period of time at the position where the lead vehicle 44 has exited from the display area 24A (at the edge of the display area 24A) when the lead vehicle 44 has exited from the upper section 52 of the display area 24A. Thus for occupants viewing the center display 24 irrespective of seated position, a driver may feel less unsettled similarly to in the first exemplary embodiment.

Third Exemplary Embodiment

In the third exemplary embodiment, an image captured with the front camera configuring the sensor section 42 is displayed on a display area 22A of a meter display 22 provided at a vehicle front side of a driver's seat together with the mark 46. The meter display 22 is provided at a vehicle front side of the driver's seat, enabling the occupant of the driver's seat to view the meter display 22 without substantially moving gaze from a scene ahead of the vehicle.

REMARKS

Note that the various processing executed in the above exemplary embodiment by the CPU 28 reading and executing software (programs) may be executed by various processors other than a CPU. Examples of such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). Moreover, each of the above processing may be executed by any one of these various types of processor, or may be executed by a combination of two or more of the same type or different types of processor (such as plural FPGAs, or a combination of a CPU and an FPGA). The hardware structure of these various types of processors is more specifically an electric circuit combining circuit elements such as semiconductor elements.

Although exemplary embodiments of the present disclosure have been described above, the present disclosure is not limited to the above exemplary embodiments, and various modifications may be made thereto. For example, flows of processing for the exemplary embodiments described above are merely examples thereof, and unnecessary steps may be removed, new steps may be added, and the processing sequence may be changed within a range not departing from the spirit thereof.

What is claimed is:

1. A display control device comprising:
a memory; and
a processor coupled to the memory and configured to:
acquire information of a moving body in surroundings of a vehicle; and
display a specific image on a display area provided to the vehicle according to a position of the moving body based on the acquired information of the moving body, the specific image being displayed either overlaid on or adjacent to the moving body;
in a case in which the moving body inside the display area has exited from the display area, continue to display the specific image inside the display area without the moving body until a specific period of time has elapsed;
while the specific image is displayed inside the display area without the moving body before the specific period of time has elapsed, continue to change a visual form of the specific image in accordance with a varying distance between the vehicle and the moving body; and
after the specific period of time has elapsed, flash the specific image plural times and then gradually eliminate the specific image from the display area.

2. The display control device of claim 1, wherein the processor is configured to change a mode of the specific image according to a position of the moving body in a case in which the moving body has exited from the display area.

3. The display control device of claim 2, wherein the processor is configured to display the specific image smaller the longer a distance is between the moving body and the vehicle.

4. The display control device of claim 2 wherein the processor is configured to reduce a brightness of the specific image the longer a distance is between the moving body and the vehicle.

5. The display control device of claim 2, wherein the processor is configured to make a color of the specific image fainter the longer a distance is between the moving body and the vehicle.

6. The display control device of claim 2, wherein:
the specific image is a bent line including a bent portion projecting upward in the display area; and
the processor is configured to make a minor angle of the bent portion smaller the longer a distance is between the vehicle and the moving body.

7. A non-transitory storage medium storing a program that causes a computer to execute display control processing, the display control processing comprising:
acquiring information of a moving body in surroundings of a vehicle;
displaying a specific image on a display area provided to the vehicle according to a position of the moving body based on the acquired information of the moving body, the specific image being displayed either overlaid on or adjacent to the moving body, and
in a case in which the moving body inside the display area has exited from the display area, continuing to display the specific image inside the display area without the moving body until a specific period of time has elapsed;
while the specific image is displayed inside the display area without the moving body before the specific period of time has elapsed, continuing to change a visual form of the specific image in accordance with a varying distance between the vehicle and the moving body; and
after the specific period of time has elapsed, flashing the specific image plural times and then gradually eliminating the specific image from the display area.

8. A display method of processing executed by a computer, the processing comprising:
acquiring information of a moving body in surroundings of a vehicle;
displaying a specific image on a display area provided to the vehicle according to a position of the moving body based on the acquired information of the moving body, the specific image being displayed either overlaid on or adjacent to the moving body, and
in a case in which the moving body inside the display area has exited from the display area, continuing to display the specific image inside the display area without the moving body until a specific period of time has elapsed;
while the specific image is displayed inside the display area without the moving body before the specific period of time has elapsed, continuing to change a visual form of the specific image in accordance with a varying distance between the vehicle and the moving body; and
after the specific period of time has elapsed, flashing the specific image plural times and then gradually eliminating the specific image from the display area.

9. A display control device comprising:
a memory; and
a processor coupled to the memory, and configured to:
acquire information of a moving body in surroundings of a vehicle;
display a specific image on a display area provided to the vehicle according to a position of the moving body based on the acquired information of the moving body, the specific image being displayed either overlaid on or adjacent to the moving body;
in a case in which the moving body inside the display area has exited from the display area, continue to display the specific image inside the display area without the moving body until a specific period of time has elapsed;
while the specific image is displayed inside the display area without the moving body before the specific period of time has elapsed, continue to change a visual form of the specific image in accordance with a varying distance between the vehicle and the moving body;
after the specific period of time has elapsed, flash the specific image plural times and then gradually eliminate the specific image from the display area; and
in a case in which a distance between the moving body and the vehicle has reached a specific distance, suppress display of the specific image.

* * * * *